United States Patent [19]

Miller et al.

[11] Patent Number: 5,800,714

[45] Date of Patent: Sep. 1, 1998

[54] RECYCLE OF WATER FROM POLYVINYL CHLORIDE POLYMERIZATION BY TREATMENT WITH A CATION EXCHANGE RESIN

[75] Inventors: Thomas M. Miller, Aurora; Bhasker B. Dave, Naperville; W. Hugh Goodman, Lisle, all of Ill.

[73] Assignee: Nalco Chemical Company, Naperville, Ill.

[21] Appl. No.: 734,571

[22] Filed: Oct. 21, 1996

[51] Int. Cl.$^6$ ............................................. B01D 15/04
[52] U.S. Cl. .................. 210/651; 210/669; 210/692; 210/805; 524/804; 524/819; 524/827; 524/836; 526/67; 526/71; 526/335; 526/341; 526/343; 526/344.2; 526/346
[58] Field of Search ..................... 210/638, 651, 210/663, 669, 692, 805; 524/804, 819, 827, 836; 526/67, 71, 335, 341, 343, 344.2, 346

[56] References Cited

U.S. PATENT DOCUMENTS 3,637,632  1/1972  Traynor ..................... 260/92.8 A
5,492,626  2/1996  Uenoyama et al. ................. 210/651

OTHER PUBLICATIONS

"*Guide to Condensate Polishing*", Dow Chemical, Oct.1989, pp. 1–23.
"Mixed Bed Deionization", Idea ±Exchange, vol. 3, No. 2 Dow Chemical Company.
"Anion Resin—Hydroxide Cycle", Idea ±Exchange, vol. 2, No. 4 Dow Chemical Company.
"Dowex HGR Cation Exchange Resin", Ion ±Exchange, T. D. Index 130.01 Revised Jun. 1, 1977, Dow Chemical Company.
"Dowex HGR-W2 Cation Exchange Resin", Ion ±Exchange, T. D. Index 140.02 Dow Chemical Company.
"Dowex HCR-S Cation Exchange Resin", Ion ±Exchange, T. D. Index 110.01 Revised Sep. 1, 1981, Dow Chemical Company.
"Dowex MSC-1 Cation Exchange Resin", Ion ±Exchange, Dow Chemical Company.
"Dowex Cation Resin Hydrogen Cycle", Ion ±Exchange, T. D. Index 510.01 Dow Chemical Company.
"Dowex 11", Ion ±Exchange, T. D. Index 240.01, Dow Chemical Company.
Purolite Technical Data C–100 Strong Acid Cation, Purolite Company, Bala Cynwyd, PA.
Purolite A–845 "Weak Base Acrylic Anion Exchange Resin", 1988 The Purolite Company, Bala Cynwyd, PA.
Purolite C–105 "Weak Acid Cation Exchange Resin", 1989, The Purolite Company, Bala Cynwyd, PA.
Purolite Ion Exchange Resins, C106, "Macroporous Weak Acid Cation Exchange Resin", 1988 The Purolite Company.
Purolite Technical Data, A300, A300E, "Strong Base Type II Anion Exchange Resin", The Purolite Company, 1989.
Purolite Technical Data, A–100, "Anion Exchange Resin Weak Base Macroporous", The Purolite Company, Bala Cynwyd, PA.
Purolite Technical Data, A–400, "Strong Base Type I Porous Anion Exchange Resin", The Purolite Company, Bala Cynwyd, PA.
Purolite Technical Data, A–444, "Anion Exchange Resin Type I Strong Base Highly Porous", The Purolite Company, 1987.
Purolite Technical Data, A–500 and A–500P, "Anion Exchange Resin Type I Strong–Base Microporous", The Purolite Company, Bala Cynwyd, PA.
Purolite Product Information, A–501P, "Strong Base Anion Type I" Apr. 1990.
Purolite Technical Data, A510, "Anion Exchange Resin Type 2 Strong–Base Macroporous", The Purolite Company, Bala Cynwyd, PA.
Purolite Ion Exchange Resins, A–520–E, "Macroporous Strong Base Anion Exchange Resin", The Purolite Company.
Purolite Product Information "SemiConductor Grade Ion Exchange Resins" The Purolite Company, Bala Cynwyd, PA.
Purolite Product Information "Conditioning of Ion Exchange Resin Before Use", The Purolite Company, 1987.
Condensate Polishing "Dowex Monosphere 550A Anion Resin", A high–efficiency, high capacity resin for mixed bed applications, Dow Chemical Company.
Miles Product Information, Lewatit S 100 MB. Miles, Inc. Pittsburgh, PA.
Miles Product Information, "Miles Ion Exchange Resins Cross–Reference Guide", Miles, Inc., Organic Products Division, Pittsburgh, PA.
Miles Product Information, "Wofatit KPS", Miles, Inc., Organic Products Division, Pittsburgh, PA.
Miles Product Information, "Lewatit CNP 80", CNP 80 WS, CNP 80 BG & CNP LF WS, Miles, Inc. Pittsburgh, PA.
Ion ±Exchange, "Strong Acid Cation Exchange Resins", T. D. Index 100.01, Dow Chemical Company, Midland, Michigan.

*Primary Examiner*—Ivars Cintins
*Attorney, Agent, or Firm*—Thomas M. Breininger; Elaine M. Ramesh

[57] ABSTRACT

Water recovered from the polymerization of vinyl monomers can be treated to remove or deactivate chain transfer agents present in the water allowing resuse in polymerization processes. The water recovered from a vinyl polymerization reaction is contacted with a cation exchange resin in the hydrogen form prior to recycle, or may be acidified and then contacted with an anion exchange resin in the hydroxide form.

21 Claims, No Drawings

RECYCLE OF WATER FROM POLYVINYL CHLORIDE POLYMERIZATION BY TREATMENT WITH A CATION EXCHANGE RESIN

FIELD OF THE INVENTION

Centrate or filtrate from aqueous emulsion or suspension polymerization processes employing certain classes of chain transfer or chain stopper agents can be effectively recycled after subjecting the centrate or filtrate to acidic conditions, preferably by contacting the centrate or filtrate with a cation exchange resin. The resin may be regenerated using conventional means after use. In a preferred aspect of practice the centrate or filtrate is subjected to ultrafiltration prior to contacting with the ion exchange resin.

Aqueous emulsion and suspension polymerization processes are utilized to prepare a large variety of modern polymers. These polymers, include, for example, polystyrene, polyvinylchloride, butadiene rubbers, acrylonitrile-butadiene-terpolymers, styrene-butadiene rubbers, and many others.

The polymerization processes which are employed for making materials of this type generally involve the use of either aqueous emulsion or suspension polymerization processes. In both of these processes the water insoluble monomers are dispersed in an aqueous phase. Free radical initiation of the polymerization is initiated, and the polymerization reaction is allowed to continue to a given point at which a desired molecular weight or chain length, or conversion of monomer to polymer is achieved. At that time, a chain transfer agent, or chain stopper may be added to the reaction to scavenge remaining free radicals, and thus stop the polymerization reaction. The resultant polymer is then separated or recovered from the polymerization mixture, often by filtration or centrifugation to produce an aqueous centrate or filtrate. The recovered polymer is subjected to additional treatment, and the water recovered as the filtrate is discarded and sent to an appropriate waste water treatment plant. While so called chain stoppers may be added to cap growing polymer chains and stop their growth, they react with free radicals in much the same way as chain transfer agents which react with free radicals whether on the end of a polymer chain, or as part of a free radical catalyst or catalyst fragment. For the purpose of this disclosure, chain transfer and chain stopper agents will be referred to hereinafter as chain transfer agents. Likewise, the aqueous phase removed from the emulsion or suspension polymerization process which as stated before can be a centrate or filtrate depending on the type of polymerization and the type of separation employed will be referred to hereinafter as filtrate. The term filtrate is meant to encompass the aqueous phase remaining after the water in-soluble polymer is removed, and other process steps completed, such as for instance the recovery by distillation of unreacted vinyl monomer.

The disposal of the filtrate wastewater after polymerization and polymer recovery is costly from both a waste treatment perspective, and because fresh treated water must be used in new polymerization reactions. One of the main reasons that filtrate have not been recycled is the presence in the filtrate water of small quantities of chain transfer materials.

The presence of an unknown, or even known amount of chain transfer agent in the aqueous phase at the start of the polymerization reaction could lead to unpredictable polymerization results, including the production of polymers having off specification molecular weight ranges, or molecular weight distributions which could make the desired polymers less useful for their desired applications. Further, the inclusion of undesired chain transfer agents in the polymer initiation phase of the reaction would consume expensive free radical catalyst, leading to uncertainty as to the amount of catalyst or initiator present for the polymerization reaction to proceed. The filtrate however is often of good water quality, deionized water often being used in commercial polymerization reactions, and thus disposal of this water also places a load upon the water make-up procedures used because water of questionable quality is often treated to improve its characteristics prior to it being used in a polymerzation reaction.

It accordingly would be an advance to the art if aqueous filtrate recovered from vinyl polymerization reactions could be used in fresh polymerization reactions.

It would be a further advance to the art if aqueous filtrate recovered from vinyl polymerization reactions employing certain classes of chain transfer materials could be treated to allow such filtrates to be recovered and reused.

It would be a still further advance to the art if an inexpensive practical method could be developed which would allow aqueous filtrate recovered from vinyl polymerization reactions employing certain classes of chain transfer materials to be treated and reused.

This invention which broadly encompasses the treatment of filtrate from vinyl polymerization reactions accomplishes these goals. We have discovered that if the filtrate from vinyl polymerization reactions which employ certain classes of chain transfer agents is contacted with a cation exchange resin, residual chain transfer or chain stopper agent is reacted, and rendered harmless thus allowing the recycle of such filtrate into fresh polymerization reactions.

Our invention is more broadly described below.

THE INVENTION

This invention, in its broadest sense relates to a method for deactivating a water soluble chain transfer agent contained in the aqueous filtrate from an oil-in-water emulsion or aqueous vinyl suspension polymerization process by contacting the filtrate containing the chain transfer agent with a water insoluble cation exchange resin. The invention also relates to a process for the recycling of the aqueous phase obtained from the free radical polymerization of a vinyl monomer, the polymerization employing a water soluble chain transfer agent, which comprises the steps of:

a. separating the polymer from the aqueous phase;

b. contacting said aqueous phase with a water insoluble cation exchange resin;

c. separating said aqueous phase from said cation exchange resin; and then, d. recovering a recyclable aqueous phase; and, e. recycling said aqueous phase.

The invention is also an improvement to vinyl polymerization processes using chain transfer agents, enabling them to be conducted more economically through the recycle of the filtrate from such processes.

The invention also relates to the deactivation or reaction of certain classes of chain transfer agents contained in an aqueous fluid by contacting the aqueous fluid containing such materials with a cation exchange resin.

While the invention is particularly directed to the treatment of recovered filtrate from an aqueous vinyl polymerization reaction, the invention is not limited to any particular class or kind of polymer so long as the polymerization is conducted in either an aqueous suspension or oil-in-water emulsion form in which water insoluble particles of the desired polymer are formed, a water soluble chain transfer agent is added to control or terminate the polymerization, and at the conclusion of the polymerization, the water insoluble particles may be removed from the filtrate.

High quality deionized water is generally utilized in the manufacture of vinyl polymers using either an aqueous suspension or oil-in-water emulsion process. At the conclusion of the polymerization process, the resultant water insoluble polymer is removed or recovered for further processing, and the resultant aqueous phase is discarded. The disposal of this aqueous phase is both costly from a waste water treatment perspective, but also because, a high quality source of water, now contaminated with such items as protective colloids, surfactants, suspending agents, and chain transfer or chain stopper agents must be replaced. Because this water contains low quantities of hardness causing cations or detrimental anions, the use of this water would be appropriate in additional polymerization processes. Likewise, if the amount of surfactant or protective colloid remaining in the water is or could be known, a savings would occur if the filtrate containing a known amount of these materials could be recycled into new polymerization processes. Unfortunately, the chain transfer present in the polymerization effluent has been a limiting factor because the inclusion of water containing materials of this type could and would lead to erratic polymerizations, and if present could lead to polymerization reactions in which too many or too few chains are initiated by the added free radical catalyst resulting in finished polymers of indeterminate molecular weights. We have found that when filtrate from an aqueous vinyl polymerization is subjected to acidic conditions, preferably by contacting the filtrate with a cation exchange resin, the chain transfer agent is destroyed, allowing the water to be recycled without fear that chain transfer present in the effluent will interfere with a new polymerization reaction.

Vinyl polymerization processes conducted as either suspension or oil-in-water emulsion processes are well known. In this type of process, a water insoluble monomer is dispersed in an aqueous phase. The mixture is generally purged with an inert gas to remove oxygen, and a free radical catalyst is added to initiate the reaction. Substantially all of the monomers may be added at the beginning of the reaction, or monomer may be slowly added over the length of time the reaction takes place. In certain circumstances, a chain transfer agent may be present in the initial reaction mixture, or one may be added at a given time and conversion. It is not the purpose of this disclosure to discuss means for the polymerization of vinyl monomers, and such information is readily available. At a given time, the conversion of the remaining monomers to polymer is optimized, and a chain transfer agent may be added to scavenge vinyl radicals and/or catalyst remnants and the polymer recovered.

The monomers typically polymerized in this manner include vinyl chloride, vinylidene chloride, acrylonitrile, styrene, butadiene, vinyl acetate, butyl acrylate, methyl acrylate, ethyl acrylate, methyl methacrylate, and many other monomers. This listing is not intended to be inclusive of all vinyl monomers, and for the purpose of the instant invention it is unimportant what monomers, and ultimately what polymer is formed.

The chain transfer agents that are utilized and which may be treated also fall within broad classes. One of the most important classes of chain transfer agents are dialkyldithiocarbamates, preferably alkali metal dimethyldithiocarbamates reported to be useful in the polymerization of butadiene rubbers and acrylonitrile-butadiene-styrene polymers and ketone thiosemicarbazones, and most especially acetone thiosemicarbazones and related compounds which are disclosed in U.S. Pat. No. 3,637,632 the disclosure of which is hereinafter incorporated by reference into this specification, as useful in the preparation of a variety of vinyl monomer materials,. Other chain transfer agents which are used in the polymerization of vinyl monomers, and to which this invention finds utility in the recycling of polymerization water containing the same including, trialkylamine containing materials which would be protonated in a low pH environment and exchanged by the process and thus removed from water, and sulfuric acid compounds such as formamidine sulfinic acid (thioureadioxide) which would also react with the ion exchange resin and be removed from the water. Chain transfer materials of this type are readily known and available from a wide variety of commercial sources.

After the filtrate is recovered it should be subjected to acidic conditions. This may be accomplished by as simple a step as adding a strong acid to the filtrate to lower the pH to a point where certain classes of chain transfer agents decompose. The addition of acid, while effective in certain cases is not a preferred embodiment of this invention however because of the inherent addition of the counter anion to the so treated filtrate. In situations where acid is utilized, the filtrate should then be passed through an anion exchange resin designed to remove the anionic counterion from the filtrate. Accordingly, the preferred method of practicing the invention is by passing the filtrate through a cation exchange resin. The cation exchange resin provides a localized source of low pH, decomposing those chain transfer agents that decompose at low pH. In addition, certain classes of chain transfer agents having a positive charge will be adsorbed onto the resin, and thus removed from the filtrate.

The cation exchange resins useful in the practice of this invention are commercial, well known cation exchange resins. These materials may be either the so called weak cation exchange resin or strong cation These resins are all water insoluble, and regenerable. Resins of this type are available commercially from many sources. Examples of resins that find utility in this invention include the cation exchange resins available from Dow Chemical Company, Midland, Mich. under the tradename Dowex® and particularly Dowex HCR-S, Dowex HCR-W2, Dowex MSC-1, Dowex HGR and Dowex HGR-W2. Cation exchange resins are also available from Rohm & Haas Company, Philadelphia and The Purolite Company, Bala Cynwyd, Pa. as well as numerous other sources. The so-called weak cation exchange resins are generally prepared from acrylic or methacrylic acid that has been cross-linked with a difunctional monomer such as divnylbenzene. Strong acid resins are generally sulfonated copolymers of styrene and divinylbenzene. A general description of ion exchange is found in the Encyclopedia of Chemical Technology, third edition, John Wiley & Sons, New York, 1981, volume 13 pages 678–705, the disclosure of which is hereinafter incorporated by reference into this specification. When utilized, these resins should be in the hydrogen form, and may later be regenerated when their capacity to absorb or deactivate other chain transfer/chain stopper agent diminishes by treatment with a strong mineral acid such as sulfuric or hydrochloric. The resins may then be rinsed with deionized water, and reused in the process of the invention. In the practice of the invention it is often times advisable to treat the filtrate prior to contacting it with the cation exchange resin. Pretreatment by filtration, ultrafiltration and the like protects the resin from fouling, and it is suspected will provide the resin bed with a longer life. In the practice of the invention, the filtrate after pretreatment may be contacted with the cation exchange resin in batch or continuous manner. In batch processing, the filtrate may be mixed with a quantity of resin effective to deactivate the chain transfer agent, and then separated by filtration, sedimentation, or centrifugation from the resin. In an other method of processing the filtrate, the filtrate after pretreatment may be passed through a column containing an effective amount of cation exchange resin to react or remove the chain transfer agent.

Where anions present in the filtrate are also desired to be removed, the filtrate may be contacted with a mixed bed of cation and an ion exchange resin. Mixtures of cation and anion exchange resin are available commercially from the manufacturers listed above for cation exchange resins. Likewise, the spent filtrate may be contacted sequentially with a cation resin and then an anion resin. When the filtrate is contacted sequentially, it is advisable to contact the filtrate first with a cation exchange resin to make sure that the filtrate has been exposed to a low pH environment such as encountered in the proximity of the cation exchange resin. It is also possible to contract the filtrate in accordance with this invention with a so called mixed bed ion exchange resin containing both cation and anion exchange resin particles. In this case, care must be taken to ensure that the residence time is sufficient in the low pH environment of the cation exchange particles. In the practice of this invention, the cation exchange resin should be in the hydrogen form, and if an anion exchange resin is used for treatment it should be in the hydroxide form.

In the case where acid is used to lower the pH of the filtrate, the filtrate, as stated before should be contacted with an anion exchange resin in the hydroxide form to remove the anionic counter ion.

As part of the invention it is important that the cation exchange resin being used is active. One of the ways of determining whether or not the resin retains activity, or whether the resin should be regenerated is to measure the outflow of the chain transfer agent. In some cases this can be done through traditional wet chemical methods while in other cases it may be possible to determine the amount of chain transfer agent passing through the resin without treatment such as for instance measuring the natural fluorescence of the chain transfer agent in the effluent from the ion exchange unit. In this case, if any fluorescence is detected, regeneration of the resin bed should be undertaken. In commercial installations it may often be necessary to maintain at least two beds of cation exchange resin, one of which can be used for treatment and one or more of which can be undergoing regeneration to the hydrogen form in accordance with the resin manufacturers recommendation.

After contact with the cation exchange resin, the recovered filtrate may be reused in a new polymerization reaction taking into account the amount of surfactant and other polymerization additives still contained in the water. If the filtrate has been subjected to an ultrafiltration pretreatment step, materials such as protective colloids, surfactants and the like which were also present in the polymerization may also have been substantially removed. When the filtrate treated in accordance with this invention is utilized, it should be used only for 5–98% by weight and preferably 10–90% by weight of the water for a new polymerization reaction and most preferably, 20–70% by weight of the water. This is because impurities present in the treated recycled water may become more concentrated after several reuses, with a resultant impact on the polymerization. The advisability of incorporating more of less of the recycled water can be determined readily by conducting small scale polymerization reactions to determine the effect of the concentrating impurities.

In order to show the surprising effect of the invention, the following examples were conducted:

EXAMPLE 1

A solution of 5 mg/l of acetone thiosemicarbazone (ATSC) was prepared in deionized water. The solution also contained 9 mg/l of $NaHCO_3$ and 16 mg/l of $Na_2SO_4$. A 13 mm glass column was loaded with 21 ml of IR210 plus, a cation exchange resin available from the Rohm and Haas Company in the hydrogen form. The solution was pumped through the column at several different flow rates and effluent samples were collected after several bed volumes were processed to allow for equilibration. The samples were analyzed by high pressure liquid chromatography (HPLC) to give the following results:

| Sample | ATSC mg/L | % removal |
| --- | --- | --- |
| feed at start | 4.50 | |
| 1.45 gpm/cu ft | <0.025 | >99.4 |
| 4.53 gpm/cu ft | <0.025 | >99.4 |
| 7.78 gpm/cu ft | 0.11 | 97.5 |
| 10.85 gpm/cu ft | 0.17 | 96.2 |
| feed at finish | 4.44 | |

While ATSC residual is shown to increase with increased flow, this is a function of residence time of the solution in the ion exchange column. The degradation of the ATSC or the ion exchange reaction occurs at a finite rate. Flow rates should be selected to obtain the desired ATSC removal rate.

EXAMPLE 2

A solution containing 5 mg/L of acetone thioseicarbazone (ATSC) was prepared in deionzied water. The solution also contained 9 mg/L of $NalCO_2$ and 16 mg/L of $Na_2SO_4$. A mixed bed ion exchange bed was prepared by combining 9.8 mL of IR120 plus cation exchange resin in the hydrogen form with 9.8 ml of Purolite A-600, an anion exchange resin available from Rohm and Haas Company, in the hydroxide form and loading the mixture into a 13 mm glass column. The solution was pumped through the column at several different flow rates and effluent samples were collected after several bed volumes were processed to allow for equilibration. The samples were analyzed by HPLC to give the following results:

| Sample | ATSC mg/L | % removal |
| --- | --- | --- |
| feed at start | 4.69 | |
| 1.17 gpm/cu ft | <0.025 | >99.5 |
| 3.26 gpm/cu ft | 0.093 | 98.0 |
| 5.40 gpm/cu ft | 0.23 | 95.1 |
| 9.56 gpm/cu ft | 0.36 | 92.3 |

EXAMPLE 3

This experiment was conducted to illustrate the use of acid addition to degrade chain transfer agent.

A solution of 214 mg/L of acetone thiosemicarbazone (ATSC) was prepared in deionized water. A 20 ml aliquot of the ATSC solution was added to 800 ml of deionized water (blank) and another 20 ml aliquot was added to a 1N solution of hydrochloric acid. Each solution was stirred. An aliquot was taken from the blank solution at 1 and 38 minutes; an aliquot was taken from the acid solution at 10 minutes, these aliquots were neutralized and immediately analyzed by HPLC to give the following results:

| Sample | ATSC mg/L | % removal |
|---|---|---|
| blank solution after 1 min. | 5.00 | |
| acid solution after 10 min. | <0.050 | >99 |
| blank solution after 38 min. | 5.03 | |

While the solution after being treated with acid was not treated with an anion exchange resin, such treatment to remove the chloride counter anions is known in the art.

Having thus described our invention, we claim:

1. A method for deactivating a water soluble chain transfer agent contained in the aqueous filtrate from a vinyl polymerization process which comprises the steps of:
    a. polymerizing a vinyl monomer in the presence of a chain transfer agent in an oil-in water emulsion or aqueous vinyl suspension polymerization process to form a water insoluble polymer;
    b. separating the water insoluble polymer from aqueous phase of the oil-in-water emulsion or the suspension to recover a water insoluble polymer and a filtrate containing a residual amount of the chain transfer agent;
    c. contacting the filtrate containing the chain transfer agent with a water insoluble cation exchange resin in the hydrogen form; and then,
    d. recovering the filtrate and reusing the filtrate in a fresh vinyl polymerization process.

2. The method of claim 1 wherein the chain transfer agent is selected from the group consisting of dialkyl dithiocarbamates and ketone thiosemicarbazones.

3. The method of claim 2 wherein the vinyl polymerization process is a process for the preparation of polyvinyl chloride and the chain transfer agent is acetone thiosemicarbazone.

4. The method of claim 3 wherein the filtrate is used for 10–90% by weight of the water used in the fresh vinyl polymerization process.

5. The method of claim 1 wherein the vinyl polymerization process is a process for the preparation of a polymer from a monomer selected from the group consisting of vinyl chloride, acrylonitrile, butadiene, styrene, and vinylidene chloride.

6. The method of claim 5 wherein the filtrate is used for 5–98% by weight of the water used in the fresh vinyl polymerization process.

7. A process for the recycling of the aqueous filtrate obtained from the aqueous free radical polymerization of a vinyl monomer, said polymerization employing a water soluble chain transfer agent, which comprises the steps of:
    a. polymerizing a vinyl monomer in the presence of a water soluble chain transfer agent in an oil-in-water emulsion or suspension polymerization process to produce a water insoluble polymer;
    b. separating the polymer from the oil-in-water emulsion or aqueous suspension to recover the polymer and an aqueous filtrate;
    c. contacting the aqueous filtrate with a water insoluble cation exchange resin in the hydrogen form;
    d. separating said aqueous filtrate from said cation exchange resin;
    e. recovering a recyclable aqueous filtrate; and then,
    f. reusing the aqueous filtrate in a fresh vinyl polymerization process.

8. The method of claim 7 wherein the chain transfer agent is acetone thiosemicarbazone and the vinyl monomer is vinyl chloride.

9. The method of claim 7 wherein the cation exchange resin is a strong acid resin.

10. The method of claim 7 wherein the cation exchange resin is a weak acid resin.

11. The method of claim 7 wherein the aqueous filtrate is contacted with the water insoluble cation exchange resin by passing the aqueous filtrate through a column of the cation exchange resin.

12. The method of claim 7 wherein the aqueous filtrate is treated with an ultrafilter prior to treatment with the cation exchange resin.

13. The method of claim 12 wherein the chain transfer agent is acetone thiosemicarbazone and the vinyl monomer is vinyl chloride.

14. The method of claim 13 wherein the filtrate is used for 20–70% by weight of the water used in the fresh vinyl polymerization process.

15. The method of claim 12 wherein the cation exchange resin is a strong acid resin.

16. The method of claim 12 wherein the cation exchange resin is a weak acid resin.

17. The method of claim 12 wherein the aqueous filtrate is contacted with the water insoluble cation exchange resin by passing the aqueous filtrate through a column of the cation exchange resin.

18. The method of claim 12 wherein the filtrate is used for 5–98% by weight of the water used in the fresh vinyl polymerization process.

19. In a process for the aqueous suspension polymerization of a vinyl monomer in which a water soluble chain transfer agent is used to control the molecular weight or molecular weight distribution of the resultant polymer, the polymer is separated from the aqueous phase to recover a polymer and an aqueous filtrate containing residual chain transfer agent, and the aqueous filtrate is reused in a vinyl suspension polymerization process, the improvement comprising: contacting the aqueous filtrate containing the residual chain transfer agent with a cation exchange resin in the hydrogen form; separating the cation exchange resin from the aqueous filtrate; and then, reusing the aqueous filtrate in a fresh vinyl polymerization process.

20. An aqueous suspension or oil-in-water emulsion polymerization process comprising the steps of:
    a) preparing an aqueous suspension or oil-in-water emulsion of water-insoluble vinyl monomers for free radical polymerization having an aqueous phase and an oil phase wherein the aqueous phase contains from 10 to 90% by weight recycled water, said water having been recycled by
        i.) contacting water from a previous aqueous suspension or oil-in-water polymerization process, said water containing residual chain transfer agent with a water-insoluble cation exchange resin in the hydrogen form to remove said residual chain transfer agent; and then,
        ii.) separating water free of said residual chain transfer agent from said resin for re-use;
    b) polymerizing said vinyl monomers in said suspension or emulsion of step
        a) under free radical conditions to form a polymer; and then,
    c) recovering said polymer.

21. The process of claim 20 wherein the aqueous phase contains from 20 to 70% by weight water which has been recycled from a previous polymerization process.

* * * * *